(12) United States Patent
Peligry et al.

(10) Patent No.: US 6,396,807 B1
(45) Date of Patent: May 28, 2002

(54) METHOD FOR THE CONTROL OF FLOWS OF DIGITAL INFORMATION

(75) Inventors: Yves Peligry, Paris; David Mouen Makoua, Nanterre; Pierre Dumas, Sevres, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/193,872

(22) Filed: Nov. 18, 1998

(30) Foreign Application Priority Data

Nov. 18, 1997 (FR) ............................................. 97 14447

(51) Int. Cl.[7] .............................................. H04L 12/56
(52) U.S. Cl. ........................................ 370/230; 370/235
(58) Field of Search ................................ 370/231, 229, 370/235, 230, 396, 400

(56) References Cited

U.S. PATENT DOCUMENTS

| | | | |
|---|---|---|---|
| 3,955,104 A | | 5/1976 | Dumas |
| 4,038,111 A | | 7/1977 | Dumas |
| 5,029,164 A | * | 7/1991 | Goldstein et al. ........... 370/396 |
| 5,430,721 A | | 7/1995 | Dumas et al. |
| 5,442,624 A | * | 8/1995 | Bonomi et al. ............. 370/253 |
| 5,446,734 A | * | 8/1995 | Goldstein ................... 370/471 |
| 5,487,072 A | | 1/1996 | Kant |
| 5,515,359 A | * | 5/1996 | Zheng ......................... 370/232 |
| 5,528,591 A | * | 6/1996 | Lauer .......................... 370/231 |
| 5,633,867 A | * | 5/1997 | Ben-Nun et al. ........... 370/236 |
| 5,825,748 A | * | 10/1998 | Benkey et al. .............. 370/236 |

OTHER PUBLICATIONS

Zygmunt Haas, "Adaptive Admission Congestion Control", Computer Communication Review, vol. 21, No. 5, Oct. 1, 1991, pp. 58–76.

* cited by examiner

*Primary Examiner*—Douglas Olms
*Assistant Examiner*—Ken Vanderpuye
(74) *Attorney, Agent, or Firm*—Oblon, Spivak, McClelland, Maier & Neustadt, P.C.

(57) ABSTRACT

A method for the control of flows of digital information between a source and a destination linked by a network of intermediate switching entities consists in carrying out a control of flows without the participation of the intermediate switching entities in estimating a state of load of the intermediate switching entities and in estimating a state of congestion of the destination to control a number of cells that may be transmitted by the source to the destination. Application to the control of flows in an ATM switch.

15 Claims, 1 Drawing Sheet

METHOD FOR THE CONTROL OF FLOWS OF DIGITAL INFORMATION

BACKGROUND OF THE INVENTION

The present invention relates to a method for the control of flows of digital information between sources and destinations connected by intermediate switching entities organized in networks.

In particular, it enables the control of digital information flows between entities of a switch, for example a switch of the ATM or asynchronous transfer mode type, Large-capacity switches are often based on the use of intermediate switching entities, internal switching modules, organized in networks between input modules and output modules. The digital information is transmitted in cellular form. At input of the network, the cells are arranged in queues depending on their destination. If necessary, these queues may be subdivided to take account of priority of transit within the network. This type of priority may be called internal priority. It determines the priority within the switch. A second type of priority can be identified. It is called external priority. External priority gives output priority to the physical port of an output module. For an output module, the term 'port' designates an output. Hereinafter in the document, the term 'port' designates the association between a physical port of an output module and an external priority and the term 'priority' designates the internal priority within the network.

The digital information that is switched by a switch is conveyed by connections set up between an input module and a port. Various types of connections exist and have been defined by the ATM Forum. They correspond to the different services that may be offered by a switch.

A first type of connection called a real-time connection generates traffic with known parameters; This traffic corresponds in particular to CBR (Constant Bit Rate) and VBRrt (Variable Bit Rate real time) services. Switching resources internal to the switch are reserved a priori as a function of the parameters of the traffic. The connections of this type are routed internally in the network in such a way that the switch renders the service that it undertook to perform when the connection was made. These connections do not raise any problems of congestion.

A second type of connection called a non-real time connection brings together connections corresponding especially to the ABR (Available Bit Rate), VBRnrt (Variable Bit Rate non-real time), UBR (Unspecified Bit Rate) and ABT (ATM Block Transfer) services. The corresponding connections are capable of generating sporadic traffic. A process of internal routing is not sufficient to resolve the problem of arrivals in blocks of cells which may generate phenomena of congestion in an internal switching module and/or at a port. In this case, a control of flows is implemented.

There are various known methods of controlling flows in a network that may be classified as a function of the entities of the network that they involve and as a function of the entities to which the control is applied. The corresponding classification brings out:

methods to control flows in leaps,
end-to-end flow control methods without participation of the intermediate switching entities and without control over these entities,
end-to-end flow control methods with the participation of the intermediate switching entities and with control over these entities.

Methods of flow control by leaps are carried out between entities, generally by an exchange of credit as defined by the QFC alliance (the Quantum Flow Control which is an alliance of industrialists interested in flow control mechanisms). Flow control by leaps can also be done by a slotting system as defined in the UIT Recommendation X.25. These controls, which are designed for networks generally external to switches, may be adapted to the control of flows in a switch. However, the low complexity and low memory capacity of the internal switching modules, dictated by constraints of cost of the switch, limit their role and enable them to achieve only a rudimentary flow control.

The end-to-end flow controls without participation of the intermediate switching entities and without control over these entities correspond to annex propositions covered by the term 'tunneling' and set up by the ATM Forum or the QFC alliance. The control provides information only to the source, an input module, on a state of congestion of the destination, which is an output module. The control does not resolve the problem of congestion of the intermediate switching entities.

End-to-end flow controls with participation of intermediate switching entities and with control over these entities have the drawback of obtaining participation by the intermediate switching entities. They are thus incompatible with the constraints of low complexity and low memory capacity imposed on the internal switching modules that constitute the intermediate switching entities. A flow control of this kind is implemented by the ABR services defined by the ATM Forum.

SUMMARY OF THE INVENTION

The invention proposes to resolve the problems of congestion both at the destination such as a port and at an intermediate entity such as an internal switching module without requiring the participation of the intermediate switching entities, A problem of congestion may arise through the following situation. Between a specific source and a specific destination, a first flow with a priority k is blocked. Between the same source and the same destination, a second flow with a priority strictly lower than k is permitted.

The invention proposes especially to prevent the above situation.

To this end, an object of the invention is a method for the control of flows of digital information, transmitted in the form of cells, between sources and destinations between which connections are set up implementing intermediate switching entities organized in networks, wherein the sources and the destinations achieve the control of flows without the participation, in the control, of the intermediate switching entities, by computing a state of congestion of the intermediate switching entities and computing a state of congestion of the destinations to control a number of cells that may be transmitted by a source to a destination.

An advantage of the method is that it achieves a control of flows between the source and the destination without the participation of the intermediate switching entities. The control of flows is based on an exchange of credits of cells between the destination and the source to permit the source to transmit cells to the destination.

In a preferred embodiment of the method, the control of flows that is achieved ensures, for a given flow, that there will be a first upper limit on the number of cells contained within the network of intermediate switching entities and a second upper limit on the number of cells distributed between the interior of the network of intermediate switching entities and the output module.

BRIEF DESCRIPTION OF THE DRAWINGS

The invention will be understood and other features and advantages of the invention shall appear from the following description of particular embodiments illustrated by the appended figures, of which.

In the different figures, the homologous elements are shown with the same references.

DETAILED DESCRIPTION OF THE INVENTION

Figure 1:
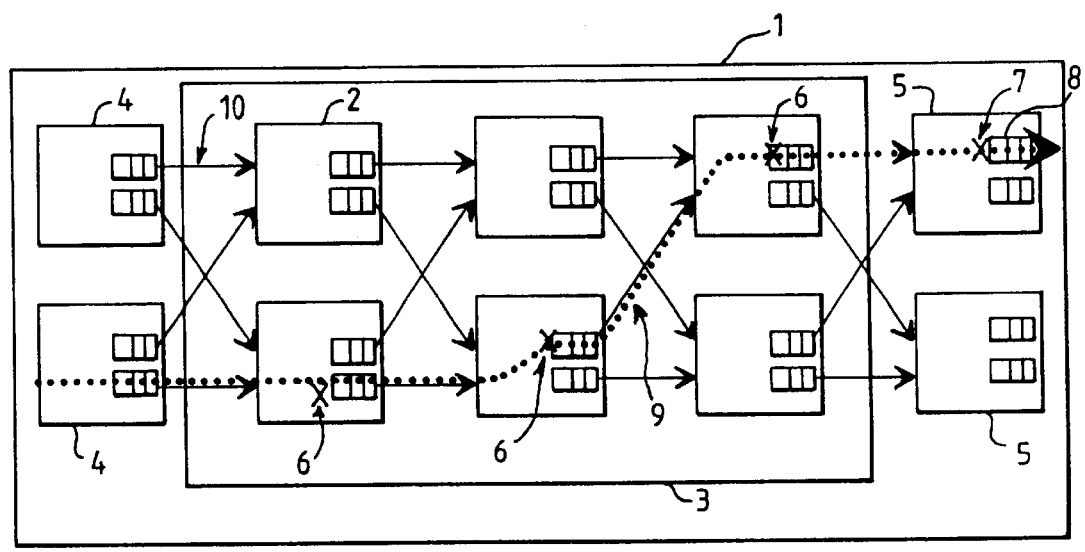
FIG. 1 shows an architecture of a switch to which the method of the invention is applicable.

FIG. 1 shows an architecture of a switch 1, for example an ATM switch, to which the method according to the invention is applicable. The switch is generally a large-capacity switch and has a structure based on the use of internal switching modules 2 organized in a network, generally called a switch fabric network 3, between input modules 4 and output modules 5. According to this structure, a congestion of the switch 1 may be due to an internal congestion 6 on one of the switching modules 2 or a congestion 7 on a port 8 of an output module 5. During the operation of this switch 1, the digital information is transmitted by connections 9 set up between an input module 4 and a port 8 of an output module 5. The connections 9 each take one transmission path among the different transmission paths 10 possible. To control the transmission of the digital information between an input module and an output module, the method according to the invention distinguishes two types of flow. A first type of flow is designated by the label M2M. It corresponds to the digital connections having a same priority level, a same input module and a same output module. A second type of flow is designated by the label M2P. It corresponds to the digital connections having one and the same priority level, one and the same input module, one and the same output module and one and the same port on this output module. Following this distinction, each flow of the M2M type is a set of flows of the M2P type.

Thus, for a switch comprising a number N1 of input modules and a number N2 of output modules, the Table 1 gives a depiction of different flow that may exist between the $i^{th}$ input module and the $j^{th}$ output module. Preferably, an ATM switch has as many input modules as output modules, N1=N2, since the modes of access are two-way access modes and since each output module p has an internal link with the input module p, where p may take any value between 1 and N1.

TABLE 1

| | | Input module i to output module J | | |
|---|---|---|---|---|
| | | Port 1 | Port m | Port N3 |
| Priority 1 | M2M (i, j, 1) | M2P (i, j, 1, 1) | M2P (i, j, 1, m) | M2P (i, j, 1, N3) |
| Priority k | M2M (i, j, k) | M2P (i, j, k, 1) | M2P (i, j, k, m) | M2P (i, j, k, N3) |
| Priority N4 | M2M (i, j, N4) | M2P (i, j, N4, 1) | M2P (i, j, N4, m) | M2P (i, j, N4, N3) |

Each output module j comprises a specified number N3 of ports. In the case of an ATM switch, each input module i preferably has one and the same specified number N3 of ports. Each digital connection may have a priority k varying from 1 to a specified number N4.

Each M2M type flow with a priority k is the combination of M2P type flows with the priority k and a port m, with m varying from 1 to N3.

With a view to clarity, only the labels M2M and M2P are used to designate a flow M2M (i, j, k) and a flow M2P (i, j, k, m).

To control the congestion of the switch, the method defines two types of credit of cells, each attached to one type of flow. The first type of credit of cells takes account of the cells contained in the network of intermediate switching modules. This type of credit is referenced CIF or Cell In Fly credit. The second type of credit of cells takes account of cells that are distributed between the network of intermediate switching modules and the output module. This type of credit is called CIBF.

Between the input module and the output module, there are as many CIF credits as there are levels of priority. Thus, in the case of a switch whose different flows are illustrated by Table 1, the method computes a maximum number N4 of CIF (M2M) credits corresponding to a maximum number N4 of M2M type flows existing between a given input module and a given output module. If this switch has N1 input modules and N1 output modules (this is generally the case with an ATM switch), the method computes a maximum number of CIF (M2M) credits N1×N1×N4.

Between an input module and a port of an output module, there are as much CIBF credits as there are priority levels. Thus, in the case of a switch whose different flows are shown by Table 1, the method computes a maximum number of CIBF (M2P) credits N3×N4 corresponding to a maximum of M2P type flows N3×N4 existing between a given input module and a given output module. If this switch has N1 input modules and N1 output modules (this is generally the case with an ATM switch), the method computes a maximum number of CIBF (M2P) credits N1×N1×N3×N4.

To compute the CIF credit attached to a given M2M type flow, the method implements a first counter, Counter_Emt (M2M) and a second counter Counter_Rcv (M2M). The first counter Counter_Emt (M2M) counts the cells sent by an input module to an output module for the given flow. The second counter Counter_Rcv (M2M) counts the cells received by the output module for the same given flow.

The difference between these two counters represents the CIF cells contained in the network of intermediate switching modules for the given flow M2M. This is expressed by the following relationship:

$$CIF(M2M) = \text{Counter\_Emt}(M2M) - \text{Counter\_Rcv}(M2M) \qquad (1)$$

To compute the CIBF credit attached to a given M2P type flow, the method implements a third counter, Counter_Emt (M2P) and a fourth counter Counter_Out (M2P). The third counter Counter_Emt (M2P) counts the cells sent by an input module to a port of the output module for the given flow. The fourth counter Counter_Out (M2P) counts the cells transmitted by this port to the exterior of the switch for the same given flow. The difference between these two counters represents the CIBF cells distributed between the network of intermediate switching modules and the port of the output module for the given flow. This is expressed by the following relationship:

$$CIBF(M2P) = \text{Counter\_Emt}(M2P) - \text{Counter\_Out}(M2P) \qquad (2)$$

The flows of each of the two types are distinguished according to their priority level in order to prevent the situation where a priority flow is blocked whereas a flow with the same destination and the same source but with a lower priority is permitted.

To attain this goal, the credits of the flows are not decremented and incremented separately: any cell sent or received leads to the incrementation or decrementation of all the counters of the M2M and M2P type flows with lower priorities.

However, the input module does not immediately have values of the second counter Counter_Rcv (M2M) and of the fourth counter Counter_Out (M2P) which depend on the output module.

At specified times, the output module informs the input module of the values of the second counter Counter_Rcv (M2M) and the fourth counter Counter_Out (M2P). These values are referenced MAJ_Counter_Rcv (M2M) and MAJ_Counter_Out (M2P). The information MAJ_Counter_Rcv (M2M) is the last value that the input module has received concerning the number of cells that it has sent and that have been received by the output module for the M2M type flow. The information MAJ_Counter_Out (M2P) is the last value that the input module has received concerning the number of cells that it has sent and that have been received and already transmitted to the exterior by the port of the output module for the M2P type flow.

Since the input module does not have values coming from the output module in real time, the method cannot compute the number of CIF cells or the number of CIBF cells from the relationships (1) and (2).

However, the method may estimate the number of cells sent by the input module and not yet received by the output module, namely the number of cells contained in the network of intermediate switching modules referenced CIF, by computing the following expression:

$$\text{Counter\_Emt}(M2M) - \text{MAJ\_Counter\_Rcv}(M2M) \quad (3)$$

Similarly, the method may estimate the number of cells that have been sent by the input module to a port of the output module and have not been yet transmitted by the port, namely the number of cells distributed between the network of intermediate switching modules and the output module referenced CIBF, by computing the following expression:

$$\text{Counter\_Emt}(M2P) - \text{MAJ\_Counter\_Out}(M2P) \quad (4)$$

The method determines two limit values Limit (M2M) and Limit (M2P) determined on the basis of the characteristics of the switch and it defines two relationships:

$$\text{Counter\_Emt}(M2M) - \text{MAJ\_Counter\_Rcv}(M2M) < \text{Limit}(M2M) \quad (5)$$

$$\text{Counter\_Emt}(M2P) - \text{MAJ\_Counter\_Out}(M2P) < \text{limit}(M2P) \quad (6)$$

Through the relationship (5) and (6), the method ensures that the number of CIF cells and the number of CIBF cells are smaller than the determined limits, Limit (M2M) and Limit (M2P). Indeed, it proves to be the case by definition that:

$$\text{MAJ\_Counter\_Rcv}(M2M) \leq \text{Counter\_Rcv}(M2M) \quad (7)$$

and $$\text{MAJ\_Counter\_Out}(M2P) \leq \text{Counter\_Out}(M2P) \quad (8)$$

This makes it possible to write:

$$-(\text{Counter\_Rcv}(M2M)) \leq -(\text{MAJ\_Counter\_Rcv}(M2M)) \quad (9)$$

and $$-(\text{Counter\_Out}(M2P)) \leq -(\text{MAJ\_Counter\_Out}(M2P)) \quad (10)$$

and therefore $$CIF(M2M) = \text{Counter\_Emt}(M2M) - \text{Counter\_Rcv}(M2M) \leq \text{Counter\_Emt}(M2M) - \text{MAJ\_Counter\_Rcv}(M2M) \quad (11)$$

and $$CIBF(M2P) = \text{Counter\_Emt}(M2P) - \text{Counter\_Out}(M2P) \leq \text{Counter\_Emt}(M2P) - \text{MAJ\_Counter\_Out}(M2P) \quad (12)$$

and thus, in combining (5) and (11) and (6) and (12), we get:

$$CIF(M2M) \leq \text{Counter\_Emt}(M2M) - \text{MAJ\_Counter\_Rcv}(M2M) < \text{Limit}(M2M) \quad (13)$$

and $$CIBF(M2P) \leq \text{Counter\_Emt}(M2P) - \text{MAJ\_Counter\_Out}(M2P) < \text{Limit}(M2P) \quad (14)$$

The values of the second counter Counter_Rcv (M2M) and the fourth counter Counter_Out (M2P) sent by the output module to the input module are called updating information elements. The updating information elements follow one transmission path among the different possible transmission paths in the same way as the cells. They are thus switched by the intermediate switching modules, just like the cells. In the particular case of implementation of the method by an ATM switch, the transmission of the updating information elements takes place as follows. For a flow M2M (i, j, k) and the associated flows M2P (i, j, k, m), the output module j sends the updating information elements, intended for the input module i, to the input module j by an internal link. The updating information elements are then transmitted to the output module i following one transmission path chosen among the different possible transmission paths. The output module i then, by means of an internal link, sends to the input module i the updating information elements from the output module j, that have gone through the input module j. In any case, the updating information elements are sent to the input module at a frequency whose choice must take account of the desire not to overload the intermediate switching modules while at the same time retaining sufficient recurrence so that the input module can accurately compute the credits of cells. The recurrence of the sending of the updating information elements is fixed by a specified incrementation limit Limit_Inc. The incrementation limit Limit_Inc defines a stop at a fifth counter Inc_Counter_Rcv (M2M) and a sixth counter Inc_Counter_Out (M2P).

The fifth counter Inc_Counter_Rcv (M2M) counts the number of cells received by the output module since the last transmission of updating information elements. The sixth counter Inc_Counter_Out (M2P) counts the number of cells transmitted to the exterior by the port of the output module since the last transmission of updating information elements.

When the fifth counter Inc_Counter_Rcv (M2M) or the sixth counter Inc_Counter_Out (M2P) reaches the limit of incrementation Limit_Inc, then an updating method is activated. The updating method consists firstly in sending the updating information elements to the input module and secondly in reinitializing, for example by a zero-setting operation, the fifth counter Inc_Counter_Rcv (M2M) and the sixth counter Inc_Counter_Out (M2P). The sending of the updating information elements is done by the transmission of an updating cell. The updating cell has a certain format that depends on the number of priorities, the number of output modules, the number of ports per output module and the limits of the cell credits, Limit (M2M) and Limit (M2P).

Let us take the following example:

The cell credits are limited to the value 32. The counters enabling the computation of these credits are thus encoded on 6 bits ($2^6$=64). The sixth bit makes it possible to prevent any ambiguity of counting. Thus, the second counter Counter_Rcv (M2M) and the fourth counter Counter_Out (M2P) are encoded on 6 bits.

The number of input modules and the number of output modules is 16. 4 bits are used to number the input modules and 4 bits are used to number the output modules.

The number of "physical" ports per output module is 4 and the number of "external" priorities is 2. There are therefore 8 ("logic") ports per output module.

The number of "internal" priorities is 6.

Figure 2:
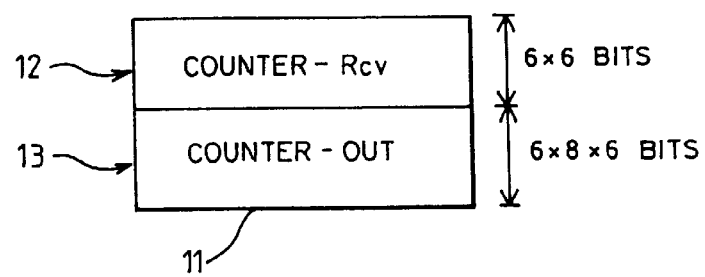
FIG. 2 shows an exemplary updating cell.

Thus, there are 6 M2M type flows between a given input module and a given output module, and each M2M type flow consists of 8 M2P type flows. The corresponding updating cell transmitted between this output module and this input module is illustrated in FIG. 2. The updating cell 11 has a first field 12 and a second field 13. The first field 12 contains the value of each second counter Counter_Rcv (M2M) of each of the six M2M type flows. Each counter is encoded on 6 bits. The total length of the field is therefore 6×6=36 bits. The second field 13 contains the value of each fourth counter Counter_Out (M2P) of each of the eight M2P type flows forming an M2M type flow. Each counter is encoded on 6 bits. The total length of the field is therefore 6×6×8=288 bits.

The characteristics of the method have been described in detail in the above description.

In preserving the example of a switch, the method is as follows: the cells that have to be transmitted by the switch are organized in queues of the FIFO (First-In-First-Out) type as a function of the input module, output module, port and level of priority of the connections for which they are intended. It is equivalent to speaking of an organization of cells as a function of the M2P type flows. Let us take a cell that has to be transmitted along the flow M2P (i, j, k1, m1), namely by a connection between the specified input module i and the specified port m1 of the specified output module j with a specified priority level k1. The transmission of the cell requires a selection of a queue in which it is stored. The selection of the queue is permitted by the method only if the relationships (5) and (6) are met. Following authorization, the cell is sent along the flow M2P (i, j, k1, m1). The first counter Counter_Emt (M2M) and the third counter Counter_Emt (M2P) of each of the flows M2M (i, j, l) and of each of the flows M2P (i, j, l, m1) having a priority level l smaller than or equal to k1 are incremented. At the reception of the cell by the output module j, the second counter Counter_Rcv (M2M) of each of the flows M2M (i, j, l) having a priority level l smaller than or equal to k1 is incremented. The fifth counter Inc_Counter_Rcv (M2M) linked to the output module j and dedicated to the flows between the input module i and the output module j is incremented. When the value of the fifth counter Inc_Counter_Rcv (M2M) is equal to the incrementation limit Limit_Inc, the updating procedure is started. At a specified instant, a cell received by the output module j is transmitted to the exterior by means of the port m1. This leads to the incrementation of the fourth counter Counter_Out (M2P) of each of the flows M2P (i, j, l, m1) having a priority level l smaller than or equal to k1 and the incrementation of the sixth counter Inc_Counter_Out (M2P) linked to the port m1 of the output module j. When the value of the sixth counter Inc_Counter_Out (M2P) is equal to the incrementation limit Limit_Inc, the updating method is activated. The updating procedure consists firstly in sending an updating cell to the input module i and secondly in reinitializing the fifth counter Inc_Counter_Rcv (M2M) and the sixth counter Inc_Counter_Out (M2P). The updating cell contains the value of the second counter Counter_Rcv (M2M) of each of the flows M2M (i, j, k) existing between the input module i and the output module j whatever its level of priority k and it contains the value of the fourth counter Counter_Out (M2P) of each of the flows M2P (i, j, k, m) existing between the input module i and the output module j whatever its level of priority k and whatever its port m. The reinitializing of the fifth counter Inc_Counter_Rcv (M2M) and the sixth counter Inc_Counter_Out (M2P) may be a zero-setting operation for example. When the input module i receives the updating cell, the method updates the information elements MAJ_Counter_Rcv (M2M) and MAJ_Counter_Out (M2P). This corresponds to the following algorithm:

Do, for all the priorities, $1 \leq k \leq N4$
    MAJ_Counter_Rcv (M2M)=Counter_Rcv (M2M)
    Do, for each port, $1 \leq m \leq N3$
        MAJ_Counter_Out (M2P)=Counter_Out (M2P)
    End
End The method then carries out the updating of all the credits of CIF cells and the updating of all the credits of CIBF cells for the M2M and M2P type flows existing between the input module i and the output module j. For this purpose, it computes the first terms of the relationships (5) and (6).

If the relationships (5) and (6) are met, a new cell may be transmitted from the module i to the module j.

The invention has been described with reference to a particular example of switch. The invention however is not limited to a device of this kind. It can be applied to any device comprising a source, a destination and intermediate switching entities organized in networks.

What is claimed is:

1. A method of controlling the flow of digital information, transmitted in the form of cells, between sources and destinations having connections therebetween set up via intermediate switching entities organized in networks, said method comprising:

estimating a number of cells sent by a source and not yet received by a destination for a first given flow;

estimating a number of cells sent by the source and not yet transmitted by the destination for a second given flow;

computing a state of congestion of the intermediate switching entities by determining if the number of cells estimated for the first given flow is greater than a first predetermined limit;

computing a state of congestion for the destination by determining if the number of cells estimated for the second given flow is greater than a second predetermined limit; and controlling the number of cells transmitted from the source to the destination based on the states of congestions of the intermediate switching entities and the destination.

2. The method according to claim 1, wherein the first flow is determined based on the source, the destination and an internal priority.

3. The method according to claim 1, wherein the second flow is determined based on the source, the destination, an internal priority, and a port of the destination.

4. The method according to claim 1, wherein the destination transmits to the source, at given points in time, an updating cell containing a first updating value equal to a latest value of the number of cells received by the destination from the source, and containing a second updating value equal to a latest value of the number of cells transmitted by the destination, wherein the estimation of the number of cells sent by the source and not yet received by the destination is obtained by subtracting the first updating value from the number of cells sent by the source for the first given flow, and wherein the estimation of the number of cells sent by the source and not yet transmitted by the destination is obtained by subtracting the second updating value from the number of cells sent by the source for the second given flow.

5. The method according to claim 1, wherein the controlling step prevents cells from being transmitted if the estimation of the number of cells sent by the source and not yet received by the destination is greater than or equal to the first predetermined limit, and if the estimation of the number of cells sent by the source and not yet transmitted by the destination is greater than the second predetermined limit.

6. A method of controlling the flow of digital information, transmitted in the form of cells, between input modules corresponding to sources and output modules including ports corresponding to destinations, and having connections therebetween set up via intermediate switching modules configured to provide connections between the input and output modules, and in which a first type of flow is defined between a given input module and a given output module, and a second type of flow is defined between the given input module and a port of the given output module, said method comprising:

estimating a number of cells sent by a source and not yet received by a destination for the first type of flow;

estimating a number of cells sent by the source and not yet transmitted by the destination for the second type of flow;

computing a state of congestion of the intermediate switching modules by determining if the number of cells estimated for the first type of flow is greater than a first predetermined limit;

computing a state of congestion for the destination by determining if the number of cells estimated for the second given flow is greater than a second predetermined limit; and controlling the number of cells transmitted from the source to the destination based on the states of congestions of the intermediate switching modules and the destination.

7. The method according to claim 6, wherein the first type of flow is determined based on the source, the destination and an internal priority.

8. The method according to claim 6, wherein the second type of flow is determined based on the source, the destination, an internal priority, and the port of the destination.

9. The method according to claim 6, wherein the destination transmits to the source, at given points in time, an updating cell containing a first updating value equal to a latest value of the number of cells received by the destination from the source, and containing a second updating value equal to a latest value of the number of cells transmitted by the destination, wherein the estimation of the number of cells sent by the source and not yet received by the destination is obtained by subtracting the first updating value from the number of cells sent by the source for the first given flow, and wherein the estimation of the number of cells sent by the source and not yet transmitted by the destination is obtained by subtracting the second updating value from the number of cells sent by the source for the second given flow.

10. The method according to claim 6, wherein the input module prevents cells from being transmitted if the estimation of the number of cells sent by the source and not yet received by the destination is greater than or equal to the first predetermined limit, and if the estimation of the number of cells sent by the source and not yet transmitted by the destination is greater than or equal to the second predetermined limit.

11. A switch comprising:

input modules corresponding to sources;

output modules including ports corresponding to destinations;

intermediate switching modules configured to provide connections between the input and output modules;.and a processing unit associated with the switch and configured to define a first type of flow between a given input module and a given output module, and to define a second type of flow between the given input module and a port of the given output module, wherein the processing unit:

estimates a number of cells sent by a source and not yet received by a destination for the first type of flow, estimates a number of cells sent by the source and not yet transmitted by the destination for the second type of flow, computes a state of congestion of the intermediate switching modules by determining if the number of cells estimated for the first type of flow is greater than a first predetermined limit, computes a state of congestion for the destination by determining if the number of cells estimated for the second given flow is greater than a second predetermined limit, and controls the number of cells transmitted from the source to the destination based on the states of congestions of the intermediate switching modules and the destination.

12. The switch according to claim 11, wherein the processing unit determines the first type of flow based on the source, the destination and an internal priority.

13. The switch according to claim 11, wherein the processing unit determines the second type of flow based on the source, the destination, an internal priority, and the port of the destination.

14. The switch according to claim 11, wherein the destination transmits to the source, at given points in time, an updating cell containing a first updating value equal to a latest value of the number of cells received by the destination from the source, and containing a second updating value equal to a latest value of the number of cells transmitted by the destination, wherein the processing unit obtains the estimated number of cells sent by the source and not yet received by the destination by subtracting the first updating value from the number of cells sent by the source for the first given flow, and wherein the processing unit obtains the estimated number of cells sent by the source and not yet transmitted by the destination by subtracting the second updating value from the number of cells sent by the source for the second given flow.

15. The switch according to claim 11, wherein the input module prevents cells from being transmitted if the estimation of the number of cells sent by the source and not yet received by the destination is greater than or equal to the first predetermined limit, and if the estimation of the number of cells sent by the source and not yet transmitted by the destination is greater than or equal to the second predetermined limit.

* * * * *